(12) United States Patent
Baumgartner et al.

(10) Patent No.: US 7,010,485 B1
(45) Date of Patent: Mar. 7, 2006

(54) METHOD AND SYSTEM OF AUDIO FILE SEARCHING

(75) Inventors: Jason Raymond Baumgartner, Austin, TX (US); Nadeem Malik, Austin, TX (US); Steven Leonard Roberts, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/498,234

(22) Filed: Feb. 3, 2000

(51) Int. Cl.
*G10L 11/00* (2006.01)
*G10L 15/04* (2006.01)

(52) U.S. Cl. ..................... 704/251; 704/270
(58) Field of Classification Search ................ 704/500, 704/231, 251, 253, 255, 233, 270, 275
See application file for complete search history.

(56) References Cited

U.S. PATENT DOCUMENTS

| | | | | |
|---|---|---|---|---|
| 5,199,077 A | * | 3/1993 | Wilcox et al. | 704/256 |
| 6,067,520 A | * | 5/2000 | Lee | 704/270 |
| 6,185,527 B1 | * | 2/2001 | Petkovic et al. | 704/231 |
| 6,296,489 B1 | * | 10/2001 | Blass et al. | 434/185 |
| 6,345,252 B1 | * | 2/2002 | Beigi et al. | 704/251 |
| 6,480,819 B1 | * | 11/2002 | Boman et al. | 704/9 |

OTHER PUBLICATIONS

ICASSP-97. 1997 IEEE International Conference on Acoustics, Speech and Signal Processing. Roy et al., "Speaker Identification Based Text to Audio Alignment for an Audio Retrieval System", pp. 1099-1102. Apr. 1997.*
Melih et al, "Audio Retrieval Using Perceptually Based Structures," 1998, Proceedings of the IEEE International Conference on Multimedia Computing and Systems, Jun. 28-Jul. 1, 1998, pp.: 338-347.*

* cited by examiner

*Primary Examiner*—Angela Armstrong
(74) *Attorney, Agent, or Firm*—Joseph P. Lally; Mark E. McBurney

(57) ABSTRACT

A system, method, and computer program product for locating an audio segment includes an input device for transmitting an input sample indicative of the audio segment and a media player for playing audio information stored on the storage device. The system further includes a sample converter to generate a digitized representation of the input sample and a digitized representation of the audio information on the storage device. The digitized representation of the input sample may include a diphthong sequence indicative of the diphthong components of the input sample. In this embodiment, an audio converter of the system generates an audio content diphthong sequence. The system may further include a comparator configured to detect a match between the input sample diphthong sequence and a portion of the audio content diphthong sequence.

12 Claims, 4 Drawing Sheets

METHOD AND SYSTEM OF AUDIO FILE SEARCHING

BACKGROUND

1. Field of the Present Invention

The present invention generally relates to the field of digital electronic information, and more particularly to a method and system for searching audio files.

2. History of Related Art

Audio information is frequently distributed on a storage medium (referred to herein as a multimedia storage medium or audio storage medium) such as a compact disc (CD), digital video disc (DVD), audio tape, or VCR tape. On such media, audio information is typically arranged in a sequential fashion. Locating a particular portion of the audio information typically requires the user to advance (or reverse) through the media under manual control in an attempt to locate the precise location containing the desired information. Typically, however, the user's ability to rapidly locate a desired portion of the audio content is significantly limited. In an application where, for example, music is stored on a CD, the user is usually able only to advance to a pre-determined number of locations within the CD, namely, the beginning of each song on the CD. Within a particular song, the user may have the ability to advance the disc by a specified amount, but the audio output is typically disabled while the disc is advanced making it difficult to locate quickly a precise point in the song. Similarly, many consumers have had the experience of fast forwarding an audio tape or VCR to find a particular location in the tape. Typically, the user must respond reactively to media content that is flashing across a television screen or coming from a speaker at an unintelligible rate resulting in a back and forth search process that is time consuming, annoying, and potentially detrimental to the media player as its mechanism are rapidly altered from fast forward and reverse settings to a play setting.

SUMMARY OF THE INVENTION

The problems identified above are in large part addressed by a system for locating an audio segment within a storage device. The system relieves a user from the tedious fast-forward, reverse, and playback process typically employed to manually search for a desired location within a media. In addition, the automated searching process disclosed herein is capable of processing information much faster than is possible using manual searching techniques. A 40×CD-ROM device, for example, could search a CD for a given input sequence at a speed far greater than the greatest speed detectable with the human ear or eye. The system includes an input device suitable for transmitting an input sample that is indicative of the audio segment and a media player suitable for playing audio information stored on the storage device. The system further includes a sample converter configured to generate an input sample diphthong sequence in response to receiving the input sample from the input device. The input sample diphthong sequence may comprise a digital representation of the diphthong components of the input sample. An audio converter of the system is configured to generate an audio content diphthong sequence. The audio content diphthong sequence may comprise a digital representation of the diphthong components of the audio information on the storage device. The system may further include a comparator configured to detect a match between the input sample diphthong sequence and a portion of the audio content diphthong sequence. In one embodiment, the input device may be a keyboard and the input sample may be a text sample. In another embodiment, the input device may be a microphone and the input sample may be an audio message. In one embodiment, the comparator is further configured to produce a signal that indicates the location within the storage device of the matching portion of the audio content diphthong sequence. A media player may be configured to receive the location signal from the comparator and to advance the storage device to the location indicated by the location signal. The storage device may comprise a compact disc, a digital video disc, a VCR, an audio tape, or other storage device suitable for storing the input sequence.

The invention further contemplates a method of operating a multimedia or audio storage device player system in which an input sample is converted to a first sequence of diphthongs. An audio segment within a storage device is then located, where the diphthong components of the audio segment and the first sequence of diphthongs satisfy match criteria. The storage device may then be advanced to the location of matching audio segment. In one embodiment, converting the input sample to a first sequence comprises converting a text sample to its component diphthongs, while, in another embodiment, converting the input sample to the first sequence includes converting an audio sample to its component diphthongs. Locating the audio segment may include converting the audio content of the storage device to a second sequence of diphthongs and comparing the first and second sequences of diphthongs for a match.

BRIEF DESCRIPTION OF THE DRAWINGS

Other objects and advantages of the invention will become apparent upon reading the following detailed description and upon reference to the accompanying drawings in which.

Figure 1:
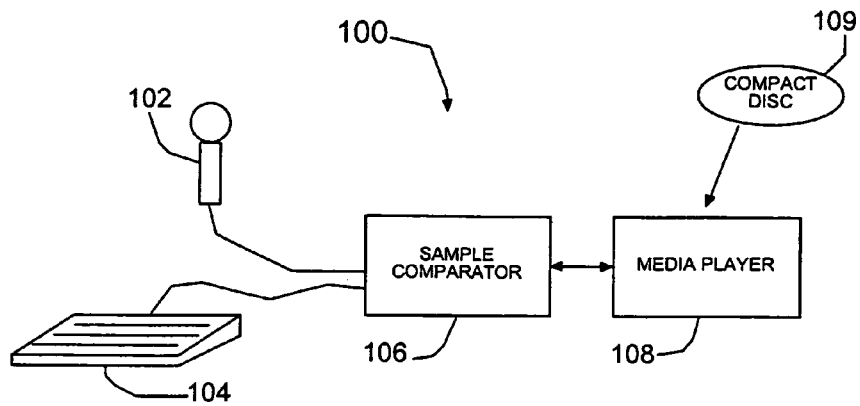
FIG. 1 is a block diagram of a system for locating a selected audio segment on a storage medium according to one embodiment of the present invention.

While the invention is susceptible to various modifications and alternative forms, specific embodiments thereof are shown by way of example in the drawings and will herein be described in detail. It should be understood, however, that the drawings and detailed description presented herein are not intended to limit the invention to the particular embodiment disclosed, but on the contrary, the intention is to cover all modifications, equivalents, and alternatives falling within the spirit and scope of the present invention as defined by the appended claims.

DETAILED DESCRIPTION OF THE DRAWINGS

Turning now to the drawings, FIG. 1 illustrates a system 100 for searching audio information to find an instance of a specified portion of audio content. In the depicted embodiment, system 100 includes an input device such as a microphone 102 or a keyboard 104 connected to a sample comparator 106. The input device is suitable for transmitting an audio or text input sample to sample comparator 106. Although the depicted embodiment indicates both a keyboard 104 and a microphone 102, system 100 may be implemented with just a single input device. Sample comparator 106 communicates with a media player 108 that is suitable for playing the content of an audio or multi-media storage device 109 (referred to herein simply as storage device 109) such as a compact disc (CD), digital video disc (DVD), VCR, or audio tape. Sample comparator 106 is preferably configured to deconstruct the text or audio input sample into a sequence of component pieces. The sequence is then used as the basis to search the content of a suitable storage device 109 for a matching sequence as defined by a specified set of match criteria. Upon detecting a match, one embodiment of system 100 is configured to advance storage device 109 to the matching entry in storage device 109. In this manner, system 100 enables a user to search automatically through a large audio file to find specified content and to set the media player at the location of storage device 109 containing the specified content.

Figure 2:
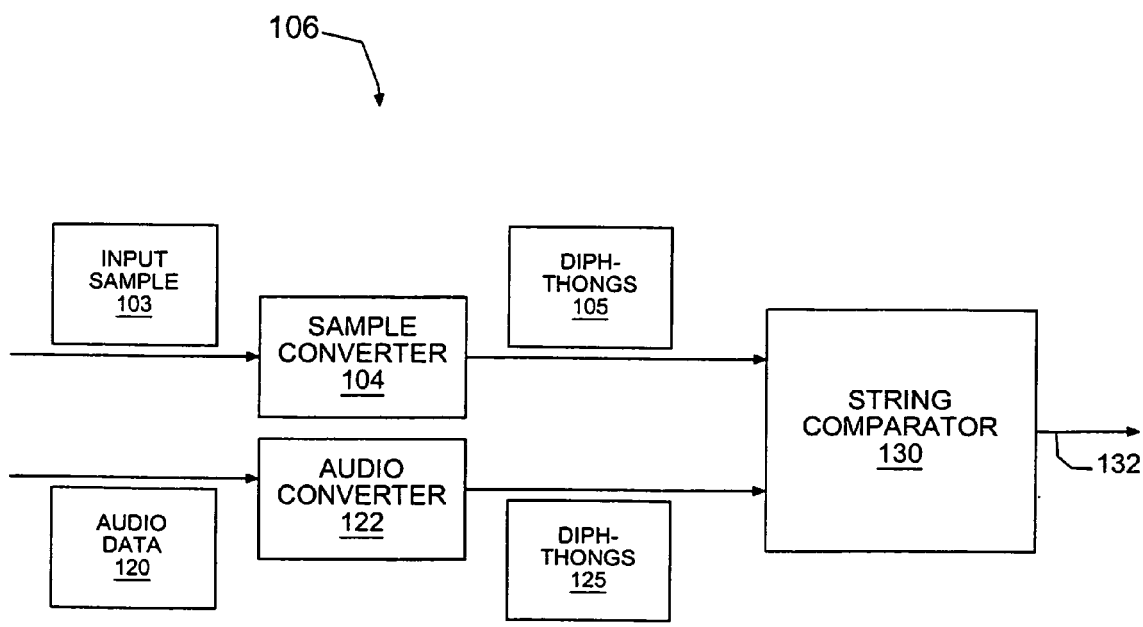
FIG. 2 is a block diagram of a sample comparator of the system of FIG. 1 according to one embodiment of the invention.

Turning now to FIG. 2 additional detail of sample comparator 106 according to one embodiment of the invention is presented. In the depicted embodiment, sample comparator 106 includes a sample converter 104 that is configured to receive specified audio content indicated by reference numeral 103 and referred to for purposes of this disclosure as an input sample. Input sample 103 may comprise audio content such as a portion of a spoken message or text content generated with a keyboard. In either embodiment, sample converter 104 is suitable for generating, from input sample 103, a sequence of monosyllabic speech sounds referred to herein as diphthongs. Diphthongs are combined to form all of the words in a spoken language. The number of diphthongs required to form the vast majority of words used in spoken languages, such as English, is relatively small thereby enabling the creation of a very large number of words from a relatively small number of diphthongs. The sequence of diphthongs generated by sample converter 104 represents the input message 103. In an embodiment in which input sample 103 comprises audio information received via microphone 102, sample converter 104 utilizes any of a variety of speech recognition techniques to transform a spoken input sample 103 into its component diphthongs. Sample converter 104 may then assign a digital value to each of the diphthongs that form the spoken input sample 103 to form a sequence of digital values that are indicative of their corresponding diphthongs. The sequence of digital values generated by sample converter 104 is identified in FIG. 2 by reference numeral 105 and referred to herein simply as diphthongs 105 or diphthong sequence 105. Thus, sample converter 104 of sample comparator 106 is adapted to generate a diphthong sequence 105 that represents and is indicative of the audio content of the input sample 103. In an embodiment in which input sample 103 comprises text information, sample converter 104 may generate diphthongs 105 based on an exact approach, using a diphthong database, or on a heuristic approach. These approaches are disclosed in a co-pending patent application of Baumgartner et al., entitled Generating Multimedia Information from Text Information Using Customized Dictionaries, which shares an assignee with the present invention and is incorporated by reference herein. As indicated in FIG. 2, the diphthong sequence 105 generated by sample converter 104 are forwarded to a string comparator 130.

Figure 5:
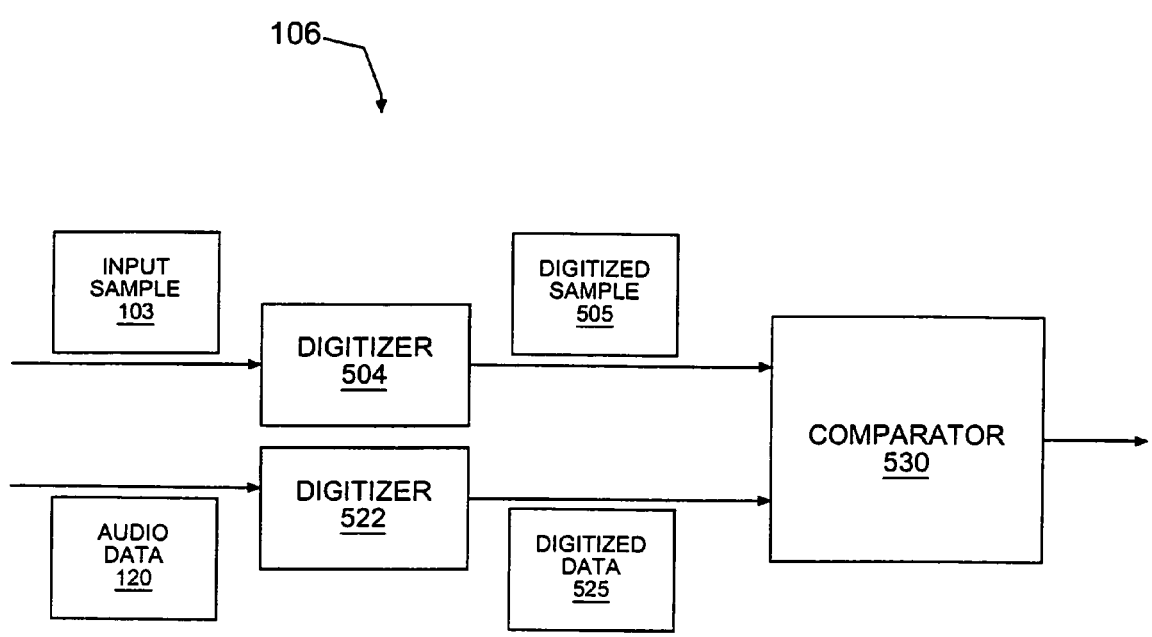
FIG. 5 is a block diagram of a sample comparator according to one embodiment of the invention.

Turning momentarily to FIG. 5, an embodiment of sample comparator 106 is depicted in which a digitized representation of input sample 103 is compared directly with the digitized representation of audio data 120 without extracting diphthong information as is done in the embodiment of sample comparator 106 depicted in FIG. 2. Instead, a first digitizer 504 generates a digitized representation of the audio (or audio video) content of input sample 103. This digitized representation (represented by reference numeral 505), is received by a comparator 530. Similarly, audio data 120 is digitized by a digitizer 522 (which may or may not comprise the same digitizer as digitizer 504) to generate a digitized representation of audio data 120 as indicated by reference numeral 525, which is also received by comparator 530. Comparator 530 then compares digitized sample 505 with digitized data 525 to determine if a match exists between the two digitized data files. This embodiment may be suitably employed in an embodiment in which the input sample 103 comprises a "real" sample, such as a Beethoven concerto segment or other type of audio content that is not readily representable by a text or speech segment.

In one embodiment, comparator 530 includes hardware and software suitable for performing a fast Fourier transform (FFT) on digitized sample 505 and digitized data 525. In this embodiment, comparator 530 further includes software suitable for performing a correlation function to check for a match in the frequency domain between digitized sample 505 and digitized data 525. In one embodiment, segments or "windows" of audio data 520 are transformed to the frequency domain by the FFT capabilities of comparator 530 and then compared with a frequency domain representation of digitized sample 505 (also generated by comparator 530). Each of these windows represents a time slice of audio data 120. In one embodiment, each window corresponds to a time slice of audio data 120 that is comparable in length to the length of input sample 103, although the length of the window is preferably alterable by the user.

In one embodiment, overlapping windows are sampled to increase the probability of capturing the portion of audio data 120 that matches input sample 103 within a single window. For example, one embodiment might include time slice windows that have a length of T seconds, where T is approximately equal to the length of input sample 103, and might sample audio data 120 every T/N seconds, where N is an integer greater than 0. If, as an example, input sample 103 is approximately 10 seconds long, the time slice window T might be 10 seconds as well. For N=2, ten second time slices would be sampled every T/N=5 seconds. Thus, each ten second time slice would overlap its neighboring time slice by five seconds. Assuming that audio data 120 contains at least one match to input sample 103, this implementation would guarantee that at least 75% of the matching segment of audio data 120 would lie within a single time slice. If greater accuracy is required, N can be increased. One embodiment, might include multiple iterations where the first iteration uses a relatively low value for N to identify windows of audio data 120 that might contain a match to input sample 103. These identified windows of audio data 120 could then be sampled during a subsequent iteration using a higher value of to achieve greater accuracy.

Returning now to the embodiment depicted in FIG. 2, sample comparator 106 further includes an audio converter 122 that is adapted to parse audio information from the storage device 109. (The audio content of storage device 109 is identified as audio data 120 in FIG. 2). Audio converter 122 may include an audio decoder capable of processing, as examples, MPEG or linear PCM encoded bit streams, wav files, etc. In addition, audio converter 122 may include an analog-to-digital converter enabling converter 122 to accept analog audio data from an audio tape or the audio track of a VCR. Audio converter 122 generates a sequence of diphthong information indicated by reference numeral 125 that is representative of the content of audio data 120. Like the input sample diphthong sequence 105, the audio data diphthong sequence 125 may be comprised of a set or sequence of digital values, each corresponding to a particular diphthong.

In the depicted embodiment, input sample diphthong sequence 105 is received by a comparator 130. Comparator 130 is adapted to search the audio data diphthong sequence 125 for a match with input sample diphthong sequence 105. By converting input sample 103 and audio data 120 to a common format, namely, a diphthong format, comparator 130 may be implemented as a conventional string comparator that utilizes standard pattern matching algorithms. When a match is detected between input sample diphthong sequence 105 and a portion of audio data diphthong sequence 125, the depicted embodiment of string comparator 130 generates a signal 132 that is received by media player 108. The signal 132 preferably indicates the location within storage device 109 where the audio segment in audio data 120 that matches input sample 103 is found. In one embodiment, media player 108 responds to signal 132 by forwarding the multi-media storage device 109 to the location indicated by signal 132 such that media player 108 may immediately begin playing at the desired location.

In one embodiment, string comparator 130 may utilize match criteria that find and report the location of exact matches between input sample diphthong sequence 105 and audio data diphthong sequence 125. In another embodiment, system 100 employs match criteria that permit the use of "fuzzy pattern matching" to desensitize system 100 to variations in speech-to-diphthong conversion technology and to allow the use of partial phrases. Fuzzy pattern matching algorithms are used in a variety of contexts including, as an example, "suggestion" generators for spelling checker applications. Additional information relative to fuzzy pattern matching algorithms is available in J. C. Bezdek & S. K. Pal (Ed.), *Fuzzy Models for Pattern Recognition: Methods That Search for Structures in Data* (IEEE; August 1992) ISBN: 0780304225, which is incorporated by reference herein. In one embodiment utilizing fuzzy pattern matching, the user is permitted to specify wildcards to further narrow down the search results. Imagine for example, a user is searching for an occurrence of the quote "all work and no play makes Jack a dull boy." If the user recalls only that the phrase begins with "all work" and ends with "dull boy," one embodiment of the invention permits the placement of either a text or an audio wildcard between the phrase fragments "all work" and "dull boy" to narrow the search beyond the scope of searching either phrase fragment on its own. The wildcard may place additional restrictions on the search results such that, for example, all phrase fragments must be located within a specified number of diphthongs of one another. In another embodiment, not explicitly shown in the drawings, sample converter 104 and audio converter 122 may generate text files in lieu of diphthong sequences. In this embodiment, sample converter 104 and audio converter 122 may employ speech-to-text software suitable for creating the text files from audio input. Comparator 130 would then search the text file representing audio data 120 for a match with the text file representing the input sample 103.

Figure 3:
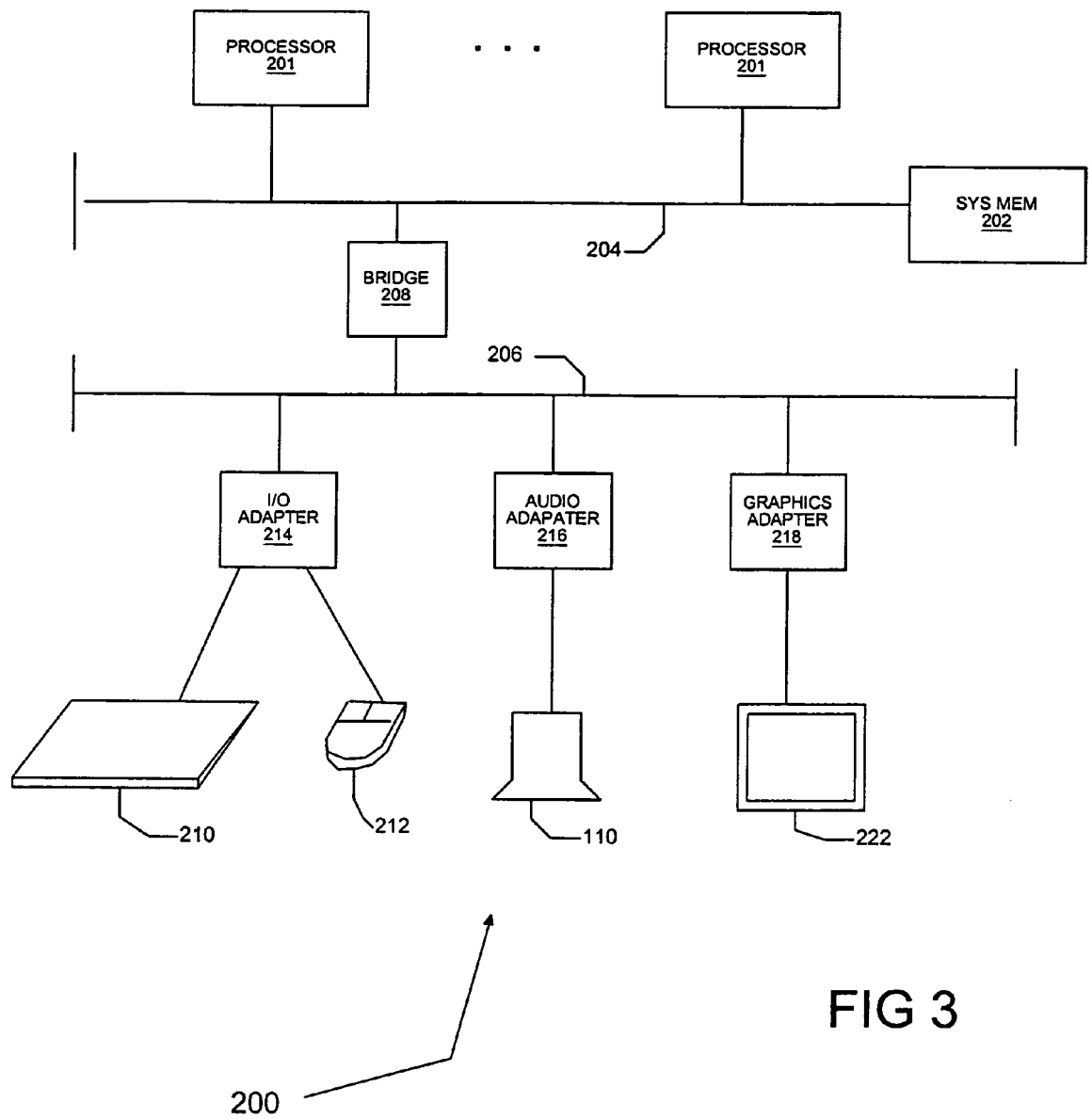
FIG. 3 is a block diagram of a data processing system suitable for implementing the sample comparator of FIG. 2.

In one embodiment, a properly configured microprocessor-based computing device may be used to implement system 100. Turning momentarily to FIG. 3, selected components of such a computing device are indicated by reference numeral 200. In the depicted embodiment, computing device 200 includes one or more processors 201 connected to a system memory 202 via a system bus 204. Any of a variety of commercially distributed microprocessors may be used as processors 201 including, as examples, PowerPC® processors from IBM Corporation, Sparc® Microprocessors from Sun Microsystems, and x86 compatible microprocessors such as Pentium® processors from Intel Corporation and Athlon® processors from Advanced Micro Devices. Computing device 200 may further include one or more bridges 208 for providing communication between system bus 204 and a peripheral bus 206. The one or more peripheral busses 206 may be compliant with industry standard peripheral busses including, as examples, the Industry Standard Architecture (ISA), the Extended Industry Standard Architecture (EISA), the Accelerated Graphics Port (AGP), and the Peripheral Component Interface (PCI) as specified in the PCI Local Bus Specification Rev. 2.2 available from the PCI Special Interest Group at www.pcisig.org and incorporated by reference herein. The depicted embodiment of computing device 200 further includes suitable input devices such as keyboard 210 and pointing device 212 connected to peripheral bus 206 via an I/O adapter 214. Computing device 200 may further include output devices including speaker 110 connected to peripheral bus 206 via audio adapter 216 and a display device 222 connected to peripheral bus 222 via a graphics adapter 218. In one embodiment, computer device 200 may comprise a conventional desktop or laptop personal computer that is connected to media player 108 through an appropriate connection. In another embodiment, system 200 may comprise an embedded data processing system within media player 108. Portions of system 100, such as sample converter 104, audio converter 122, and string comparator 130, may be implemented as a set of instructions stored on a computer readable medium such as system memory 202 of computer device 200, a hard disk, floppy disk, CD ROM, magnetic tape, or other storage facility. In this implementation, the set of computer instructions are suitable for execution by processor(s) 201 of system 200 or by another suitable processor or controller.

Figure 4:
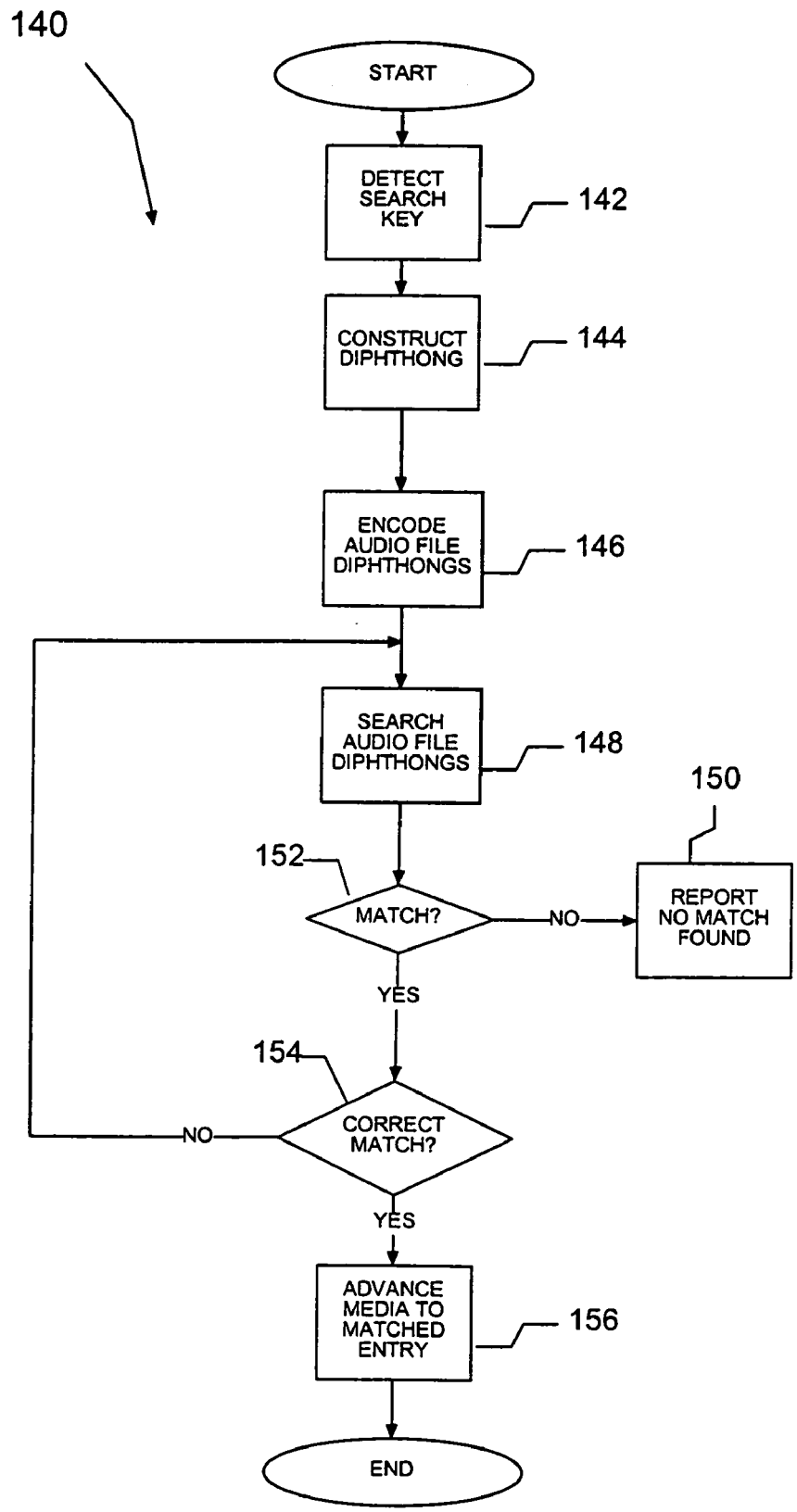
FIG. 4 is a flow diagram of a method of searching for an audio segment according to one embodiment of the invention.

Turning now to FIG. 4, a flow diagram illustrating a method 140 of searching a storage device for specified audio content is depicted. The method 140 enables a user to quickly and automatically locate a desired point in a storage device containing audio content. The method improves on the cumbersome and time consuming method by which a user is typically required to advance through a multimedia storage device attempting to locate a specific passage or location. In the embodiment depicted in FIG. 4, an input sample is initially detected in step 142. The input sample, as discussed previously, may be an audio segment that is spoken by the user or a text segment that is typed or otherwise written by the user. Alternatively, the input may comprise an audio or audio-video sample stored on a storage media. As an example, the user may have a small audio or audio-video segment on an analog tape as the input sample. In this embodiment, the media player 108 depicted in FIG. 1 may serve as the input device as well as the device used to transmit audio data 120 to audio converter 122. In any event, the input sample indicates (in either an exact manner or in a "fuzzy" manner) the audio content of the storage device for which the user is searching. Upon detecting the input sample, an input sample diphthong sequence (the input sequence) is constructed in step 144 with a sample converter that is configured to receive the input message in the form of a text file in the case of a typed input sample, a digitized representation of an audio message in the case of a spoken input sample, or both. In parallel with the construction of the input sequence, audio data from the multimedia storage device is processed or encoded in step 146 to produce an audio content diphthong sequence. The encoding of the audio data may occur either before, during, or after the construction of the input sequence in step 144. The input sequence is then used (in conjunction with specified match criteria) to search (step 148) the audio data diphthong sequence. If no match between the input sample diphthong sequence and the audio data diphthong sequence is detected in step 152, a message indicating that no match occurred is generated in step 150. If a match is detected, the depicted embodiment of method 140 includes a step 154 in which the user is prompted to indicate whether the matching is the entry that user was searching for (in case the multimedia storage device includes multiple occurrences of the storage information). If the user indicates that the matching entry is the correct entry, the multimedia storage device is advanced (step 156) to the matched entry. If the user indicates that the matching entry is not the correct entry, the method returns to searching step 148 to find the next occurrence of the input sample in step 148. In one embodiment, the production of the audio content diphthong sequence and the searching of the sequence occur in a "handshaking" fashion. In this embodiment, as diphthong sequences are generated in step 146 by the converter, they are forwarded to the comparator and searched in step 148. If the comparator detects a match, it sends a command to the media player, such as an audio tape player, to stop and to rewind by the appropriate amount to the beginning of the matching segment. The rewinding can be handled by sending offset information to the comparator with each diphthong. When the comparator detects a match, the offset information can be re-sent to the media player to indicate the beginning location of the segment upon determining that the segment matches the input sequence. This handshaking embodiment beneficially requires less memory by eliminating the need to save the contents of the entire media device until the search process is initiated. In addition, by detecting matching diphthong sequences as they are generated, the media device will be at or near the physical location of the matching sequence when it is detected thereby eliminating the need to rewind or fast-forward the media player by a significant amount.

It will be apparent to those skilled in the art having the benefit of this disclosure that the present invention contemplates a system and method for locating content within a multimedia or audio storage device. It is understood that the form of the invention shown and described in the detailed description and the drawings are to be taken merely as presently preferred examples. It is intended that the following claims be interpreted broadly to embrace all the variations of the preferred embodiments disclosed.

The invention claimed is:

1. A system for locating an audio segment within a storage device, comprising:
    an input device suitable for transmitting input sample text indicative of the audio segment;
    a media player suitable for playing audio content stored on the storage device;
    a sample converter configured to generate an input sample diphthong sequence in response to receiving the input sample text from the input device, wherein the input sample diphthong sequence comprises a digital representation of the diphthong components of the input sample;
    an audio converter configured to generate an audio content diphthong sequence comprising a digital representation of the diphthong components of the audio content of the storage device; and
    a comparator configured to detect a match between the input sample diphthong sequence and a portion of the audio content diphthong sequence.

2. The system of claim 1, wherein the input device comprises a keyboard.

3. The system of claim 1, wherein the input device comprises the media player and the input sample comprises information recorded on a storage media.

4. The system of claim 1, wherein the comparator is further configured to produce a signal indicative of the location within the storage device of the matching portion of the audio content diphthong sequence.

5. The system of claim 4, further comprising a media player configured to receive the location signal from the comparator and to advance the storage device to the location indicated by the location signal.

6. The system of claim 1, wherein the storage medium comprises a compact disc.

7. The system of claim 1, wherein the storage medium comprises a digital video disc.

8. A computer program product for locating an audio segment in a storage device, the computer program product comprising a computer readable medium configured with processor executable instructions, comprising:
    first converter means for generating a first diphthong sequence responsive to receiving input sample text, wherein the first diphthong sequence is indicative of the input sample text;
    second converter means for generating a second diphthong sequence from audio information stored on the storage device; and
    comparator means for locating a portion of the second diphthong sequence, wherein the located portion of the second diphthong sequence and the first diphthong sequence match according to a specified set of match criteria.

9. The computer program product of claim 8, wherein the comparator means includes means for indicating the location within the storage device of the audio information corresponding to the second diphthong sequence.

10. The computer program product of claim 8, wherein the match criteria require exact match between the first and second diphthong sequence.

11. The computer program product of claim 8, wherein the match criteria are fuzzy criteria.

12. The computer program product of claim 8, wherein the computer readable medium comprises a storage medium is one of a floppy diskette, hard disk, CD ROM, or magnetic tape.

* * * * *